Figure 4:
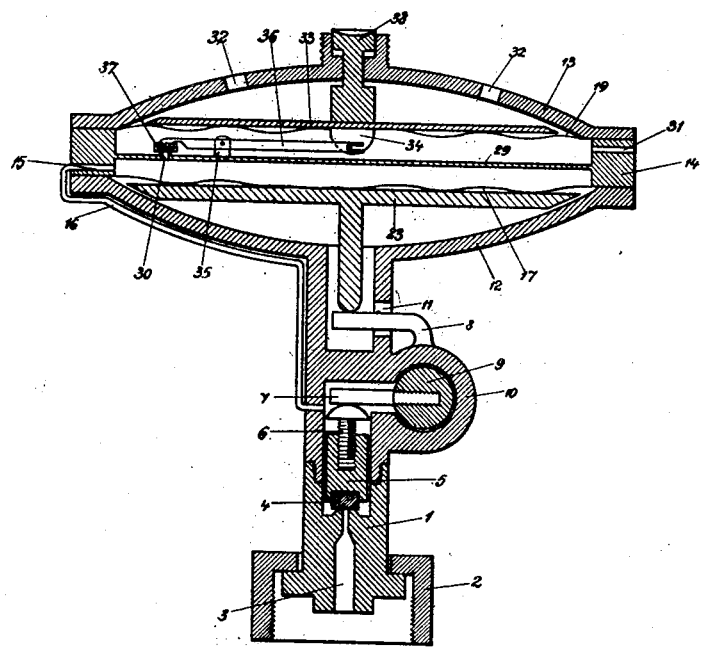

G. STÖLLE.
PRESSURE REDUCING VALVE.
APPLICATION FILED MAY 20, 1915.
1,198,595.
Patented Sept. 19, 1916.
2 SHEETS—SHEET 1.
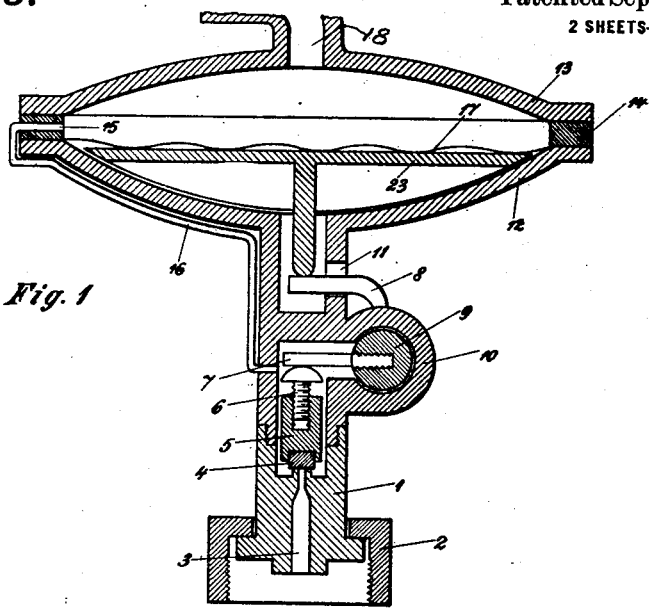
*Fig. 1*
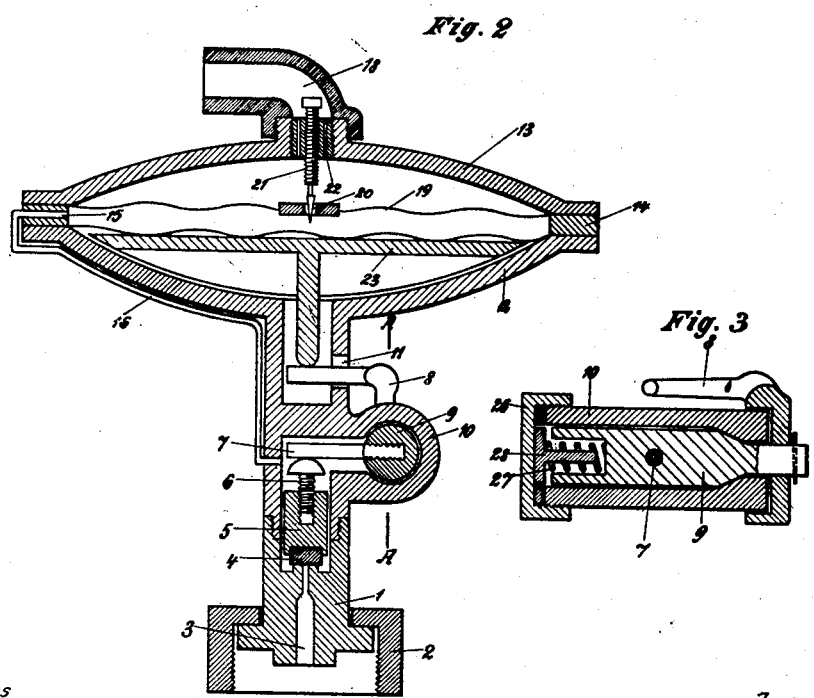
*Fig. 2*
*Fig. 3*
Witnesses
B. Miller
E. Goethe
Inventor
Georg Stölle

G. STÖLLE.
PRESSURE REDUCING VALVE.
APPLICATION FILED MAY 20, 1915.

1,198,595.

Patented Sept. 19, 1916.
2 SHEETS—SHEET 2.

UNITED STATES PATENT OFFICE.

GEORG STÖLLE, OF KIEL, GERMANY.

PRESSURE-REDUCING VALVE.

1,198,595.  Specification of Letters Patent.  Patented Sept. 19, 1916.

Application filed May 20, 1915. Serial No. 29,431.

*To all whom it may concern:*

Be it known that I, GEORG STÖLLE, engineer, a subject of the German Emperor, and residing at Kiel, in Germany, have invented certain new and useful Improvements in Pressure-Reducing Valves, of which the following is a specification.

The present invention relates to pressure reduction valves for use in connection with breathing apparatus. The breathing equipments with which the new valves are used, may themselves be employed for a variety of purposes, either on land or in independent diving equipments of different kinds. The invention may also be used in connection with armor diving equipments where a constant pressure is required in the interior of the armor and in the ducts or passages where the air for breathing circulates.

The object of the invention is primarily to provide for the admission of gas at a reduced pressure from a compressed gas reservoir (*e. g.* a flask of oxygen) into the passages in which the gas inhaled by the breathing organs circulates, or to continually take a certain quantity of gas from the reservoir at a reduced pressure until the reservoir is emptied.

Another object of the invention, especially in connection with breathing apparatus for diving equipments is to maintain a predetermined correspondence between the pressure of the surrounding environment and the pressure within the breathing gas passages.

A further important object of the invention is to provide an improved connection or transmission mechanism between a pressure responsive control diaphragm and the inlet valve.

Several embodiments of the invention are shown by way of example in central longitudinal section.

In the drawings: Figure 1 illustrates a valve for discharging gas under a pressure that is reduced with respect to pressure in the gas reservoir. Fig. 2 shows a valve with two diaphragms that inclose a hollow space and that are arranged so that the quantity of gas discharged in a unit of time remains constant. Fig. 4 illustrates a reducing valve having two diaphragms that are separated by a rigid partition, the valve being arranged to produce an internal gas pressure in a breathing apparatus that corresponds to the pressure of the enveloping medium. Fig. 3 shows a section of Fig. 2 on the line A—A.

In the drawing 1 indicates the pipe connecting piece of the pressure reduction valve which is connected by means of a nut 2 to a reservoir (not illustrated) containing compressed gas. A hole 3 is bored in the connecting piece and the upper end of the bore of the inlet valve is blocked by a valve plate 4. This plate is lodged in a recess of a cylindrical guide 5, which is arranged to move up and down in the inflow chamber and intermediate space and which has an adjustable screw 6 at its upper end by which the stroke of the valve may be regulated. Resting on the adjustable screw is a pin 7. This pin, in combination with a bent arm 8, forms a two-armed lever which rocks on an axis 9 that is revolubly mounted in a casing 10 that is integral with the body of the valve. The axis 9 is so fitted in the casing as to be gas-tight. The arm 8 extends through an opening 11 in the valve body and supports a plate 23 which is mounted in an upper valve chamber so as to be movable in a vertical direction. The medium that surrounds the valve body has access to a portion of the interior of the body through the opening 11.

The upper chamber consists of two cups 12 and 13 between which a ring 14 is fixed. The end of a conduit 15 penetrates through the ring 14. The conduit consists of a side pipe 16 that is led along the outside of the valve body and that issues in the inflow chamber that contains the guide 5. In Fig. 1 the space inclosed by the cups 12 and 13 also contains a diaphragm 17, that is clamped between the ring 14 and the lower cup 12, and against which the plate 23 bears so that the movements of the diaphragm are imparted to the two-armed lever and are transmitted to the inflow-control-member 4, 5. The chamber above the diaphragm 17, which is filled with gas of a reduced pressure, is provided with a connecting pipe 18 through which the gas flows out into the actual breathing apparatus and to which this apparatus is connected.

In the modification shown in Fig. 2 the upper valve chamber contains two diaphragms 17, 19 which are clamped between the cup 12 and the ring 14, and the cup 13 and the ring 14 respectively. The two diaphragms thus form another chamber into which the side pipe 16 enters. The pressure in the chamber inclosed between the diaphragms is the reduced pressure of the gas taken from the reservoir through the inlet 3. The plate 23 bears against the lower diaphragm as in the case of Fig. 1. In the valve shown in Fig. 4 the hollow space between the two diaphragms 17 and 19 is divided by a rigid partition 29 in which there is only a small opening 30 which serves as a gas passage. The mouth of the side pipe 15 enters in the lower intermediate chamber beneath the partition 29 while the upper intermediate chamber is connected to the breathing air passages by the hole 31. The upper cup 13 is provided with openings 32 so that the water in which the device is submerged also has access to the outer side of the diaphragm 19. This diaphragm is firmly fixed to a plate 33 by a bolt which acts as a guide for one end of a two-arm lever 36 that is pivoted in a bearing 35 arranged on the partition 29. The other end of the lever 36 carries a plate 37 which closes or opens the passage 30. A press button 38 is inserted in the middle of the upper cup 13 which permits of the closing plate 37 being lifted by hand with the aid of the plate 33 and the lever 36.

In the center of diaphragm 19 (Fig. 2) is an opening 20 the size of which may be adjusted by a pin 21 that is movably mounted in the upper cup 13. The hole in which the pin moves is surrounded by openings 22 that enter into the connecting pipe 18 which leads to the breathing apparatus.

The construction of the casing 10 and the gas-proof bearing 9 of the two-arm lever 7, 8 is seen in detail in Fig. 3. The casing envelops the revoluble axis in the manner of a stuffing box except the cone-shaped portion 24. The pin 7 is fixed in the middle of the axis 9 while the arm 8, that is bent squarely at two points so as to extend in two directions, is combined with a cap 25 which surrounds the bushing 10 at one end and is fixed to the axis 9. The cap 25 thus rotates with the axis or transfers its motions to the axis and thus to the pin 7. The other end of the bushing 10 is made gas-tight by a screw-cap 26 which on being screwed tight psuhes the axis firmly into the bushing by means of a pressure spring 27 and a guiding pin 28 situated in this spring.

The operation of the pressure reducing valve illustrated in Fig. 1 is as follows: When the closing valve of the compressed gas reservoir is opened the blocking plate 4 at the inlet opening is raised, the resistance offered by the diaphragm 17 being overcome by the pressure of the inflowing gas which passes through the hole 3 in the connecting piece 1 into the inflow chamber and thence through the side pipe 16 into the chamber above the diaphragm 17. The reduction of pressure takes place during the entrance of the gas into the inflow chamber. The gas of reduced pressure flows through the connecting pipe 18 into the breathing apparatus. When the pressure rises above a certain degree the diaphragm is pushed downward and closes the gas inlet by means of the two-arm lever 7, 8 until the pressure in the chamber above the diaphragm diminishes and allows the diaphragm to be moved up again. In the case of Fig. 2 the gas that passes out of the gas reservoir flows into the chamber between the two diaphragms. The rise of pressure caused thereby results in the two diaphragms being moved farther apart and in the size of the inlet opening and of the outlet opening being diminished. This condition will last until the pressure is lowered again so that the diaphragms can move back to their original positions. As long as gas continues to be taken from the valve casing into the breathing apparatus the diaphragms will cause the alternate increasing and diminishing of the cross-section of the inlet and outlet openings. But the changes of cross-section of these openings do not occur simultaneously because the diaphragm 19 responds immediately to each change of pressure in the valve, while diaphragm 17 will lag somewhat on account of the resistance that has to be overcome.

On account of the space beneath the diaphragm 17 being in communication with the medium surrounding the valve, the new valve will fulfil the requirement to be met in connection with diving apparatus, viz. that the pressure in the air circulation pipe shall bear a certain relation to the pressure of the water in which the device is submerged. The pressure beneath the lower diaphragm will always be the pressure of the surrounding water. The reduction of pressure will thus adapt itself automatically to the variable counterpressure but the quantity of the gas administered will not be affected.

In the modification shown in Fig. 4 the gas discharged from the compressed gas reservoir into the valve continues passing into the lower chamber formed by the partition 29 and the diaphragm 17 until the pressure in this chamber is equal to the pressure of the enveloping medium, e. g. the water, that bears against the outer side of the diaphragm. The inlet opening 3 is then closed. If the pressure in the upper chamber that is connected to the breathing apparatus through the outlet opening 31 is lower than the pressure of the enveloping medium which bears upon the outer side of the diaphragm 19 this diaphragm will be bent inward. The lever 36 will then open the passage 30 until equal pressures also exist on both sides of the diaphragm 19. The reduction of pressure in the breathing gas passages is thus automatically caused to correspond to the pressure variations of the enveloping medium. The user of the equipment is also able to alter the pressure in the breathing equipment independently of the pressure of the outside medium by pressing the button 38.

I claim:—

1. A pressure reduction valve comprising in combination a casing, a pressure reducing gas inlet and gas outlet in said casing, an inlet control diaphragm, an outlet control diaphragm and a partition wall between said diaphragms, said diaphragms forming with said casing and said wall a double compartment chamber into which the fluid from the supply source is introduced, the outlet control diaphragm being dependent upon the pressure in one compartment and the inlet control diaphragm being dependent on the pressure of the other compartment, and both diaphragms being actuated by environment pressure.

2. A pressure reduction valve comprising in combination a diaphragm, a casing forming a chamber at one side of the diaphragm and a second chamber at the other side of the diaphragm that is in communication with the medium surrounding the valve, an inlet for introducing gas from the supply source at a reduced pressure into the first chamber, said diaphragm being arranged so as to move in response to the pressure variations of the introduced gas and of the surrounding medium, an inlet-varying-device for altering the size of the said inlet, and a two-arm lever with an axis journaled in a gas-tight bearing in the said casing, the one arm of the lever coöperating with the said inlet-varying-device and the other arm coöperating with the said diaphragm.

3. A pressure reduction valve comprising in combination a casing, a pressure reducing gas-inlet and a gas-outlet in said casing, an inlet-varying-device for altering the size of the said inlet, an inlet control diaphragm, an outlet control diaphragm, a partition wall between said diaphragms, said diaphragms forming with said casing a double compartment space into which gas from the source of supply is introduced, the said outlet control diaphragm being exposed to reduced pressure at the outlet and actuated by environment pressure, the said inlet control diaphragm responding to the pressure of the surrounding environment, a two-arm lever with an axis journaled in a gas-tight bearing in the said casing, the one arm of the lever coöperating with the said inlet-varying-device and the other arm coöperating with the inlet-control-diaphragm.

4. A pressure reduction valve comprising in combination a casing, a gas inlet and a gas outlet, inlet and outlet control diaphragms forming a chamber, a rigid partition between the said diaphragms dividing the chamber into two compartments which are in communication with each other through an opening in the partition, a gas duct leading from the inlet into the compartment formed by the inlet control diaphragm and the rigid partition, the sides of the inlet- and outlet-control-diaphragms that are turned away from the said compartments being subjected to the pressure of the enveloping medium, and means controlled by hand for altering the size of the said opening in the said partition.

5. A pressure reduction valve comprising in combination a casing, a gas inlet and a gas outlet, inlet and outlet control diaphragms forming a chamber, a rigid partition between the said diaphragms dividing the chamber into two compartments which are in communication with each other through an opening in the partition, a gas duct leading from the inlet into the compartment formed by the inlet control diaphragm and the rigid partition, the sides of the inlet- and outlet-control-diaphragms that are turned away from the said compartments being subjected to the pressure of the enveloping medium, and means controlled by the outlet-control diaphragm for automatically altering the size of the said opening in the said partition.

In testimony whereof I affix my signature in presence of two witnesses.

GEORG STÖLLE.

Witnesses:
Julius Rönke,
Hermann Schutt.

It is hereby certified that in Letters Patent No. 1,198,595, granted September 19, 1916, for an improvement in "Pressure-Reducing Valves," the name of the patentee was erroneously written and printed as "Georg Stölle," whereas said name should have been written and printed as *Georg Stolle;* and that the said Letters Patent should be read with this correction therein that the same may conform to the record of the case in the Patent Office.

Signed and sealed this 20th day of March, A. D., 1917.

[SEAL.]

F. W. H. CLAY,

*Acting Commissioner of Patents.*

Cl.-50—10.